US006956573B1

(12) United States Patent
Bergen et al.

(10) Patent No.: US 6,956,573 B1
(45) Date of Patent: Oct. 18, 2005

(54) METHOD AND APPARATUS FOR EFFICIENTLY REPRESENTING STORING AND ACCESSING VIDEO INFORMATION

(75) Inventors: James Russell Bergen, Hopewell, NJ (US); Curtis R. Carlson, Princeton, NJ (US); Rakesh Kumar, Monmouth Jct., NJ (US); Harpreet S. Sawhney, Cranbury, NJ (US)

(73) Assignee: Sarnoff Corporation, Princeton, NJ (US)

( * ) Notice: Subject to any disclaimer, the term of this patent is extended or adjusted under 35 U.S.C. 154(b) by 1414 days.

(21) Appl. No.: 08/970,889

(22) Filed: Nov. 14, 1997

Related U.S. Application Data

(60) Provisional application No. 60/031,003, filed on Nov. 15, 1996.

(51) Int. Cl.[7] .............................................. G06T 15/00
(52) U.S. Cl. ...................................................... 345/473
(58) Field of Search ............................... 345/327, 473; 382/284, 220, 305, 236; 715/716

(56) References Cited

U.S. PATENT DOCUMENTS

| | | | | |
|---|---|---|---|---|
| 4,941,125 A | | 7/1990 | Boyne ........................ | 364/900 |
| 5,485,611 A | | 1/1996 | Astle .......................... | 395/600 |
| 5,550,965 A | | 8/1996 | Gabbe et al. ............... | 395/154 |
| 5,635,982 A | * | 6/1997 | Zhang et al. ............... | 348/231 |
| 5,649,032 A | | 7/1997 | Burt et al. .................. | 382/284 |
| 5,657,402 A | | 8/1997 | Bender et al. .............. | 382/284 |
| 5,706,417 A | * | 1/1998 | Adelson ..................... | 395/129 |
| 5,751,286 A | * | 5/1998 | Barber et al. ............... | 345/348 |
| 5,821,945 A | * | 10/1998 | Yeo et al. ................... | 345/440 |
| 5,915,044 A | * | 6/1999 | Gardos et al. .............. | 382/236 |

OTHER PUBLICATIONS

Shibata et al. ("Content-Based structuring of video information": 0-8186-7436-9/96, 1996 IEEE).*
Jaillon et al. ("Image Mosaicing Applied to Three-Dimensional Surfaces": 1051-4651/94—1944 IEEE).*
Smoliar et al ("Content-based Video indexing and Retrieval": 1070-986x/94—1994 IEEE).*
HongJiang Zhang, Atreyi Kankanhalli, Stephen W. Smoliar, "Automatic Partitioning of Full-motion Video", Multimedia Systems pp. 10-28, 1993.
Y. Gong, C. H. Chuan, Z. Yongwei, M. Sakauchi, "A Generic Video Parsing System With A Scene Description Language (SDL)", Real-Time Imaging, vol. 2, pp. 45-59, 1996.
H. D. Wactlar, T. Kanade, M. A. Smith, S. M. Stevens, "Intelligent Access to Digital Video: Informedia Project", IEEE Computer Society, vol. 29, No. 5, pp. 46-52 (1996).
M. Christel, S. Stevens, T. Kanade, M. Mauldin, R. Reddy and H. Wactlar, "Techniques for the Creation and Exploration of Digital Video Libraries", Multimedia Tools and Applications, vol. 2, pp. 1-33, (1996).

* cited by examiner

Primary Examiner—Almis R. Jankus
(74) Attorney, Agent, or Firm—William J. Burke

(57) ABSTRACT

A method and concomitant apparatus for comprehensively representing video information in a manner facilitating indexing of the video information. Specifically, a method according to the inveniton comprises the steps of dividing a continuous video stream into a plurality of video scenes; and at least one of the steps of dividing, using intra-scene motion analysis, at least one of the plurality of scenes into one or more layers; representing, as a mosaic, at least one of the pluraliy of scenes; computing, for at least one layer or scene, one or more content-related appearance attributes; and storing, in a database, the content-related appearance attributes or said mosaic representations.

23 Claims, 10 Drawing Sheets

METHOD AND APPARATUS FOR EFFICIENTLY REPRESENTING STORING AND ACCESSING VIDEO INFORMATION

The invention claims benefit of U.S. Provisional Application No. 60/031,003, filed Nov. 15, 1996.

The invention relates to video processing techniques and, more particularly, the invention relates to a method and apparatus for efficiently storing and accessing video information.

BACKGROUND OF THE DISCLOSURE

The capturing of analog video signals in the consumer, industrial and government/military environments is well known. For example, a moderately priced personal computer including a video capture board is typically capable of converting an analog video input signal into a digital video signal, and storing the digital video signal in a mass storage device (e.g., a hard disk drive). However, the usefulness of the stored digital video signal is limited due to the sequential nature of present video access techniques. These techniques treat the stored video information as merely a digital representation of a sequential analog information stream. That is, stored video is accessed in a linear manner using familiar VCR-like commands, such as the PLAY, STOP, FAST FORWARD, REWIND and the like. Moreover, a lack of annotation and manipulation tools due to, e.g., the enormous amount of data inherent in a video signal, precludes the use of rapid access and manipulation techniques common in database management applications.

Therefore, a need exists in the art for a method and apparatus for analyzing and annotating raw video information to produce a video information database having properties that facilitate a plurality of non-linear access techniques.

SUMMARY OF THE INVENTION

The invention is a method and apparatus for comprehensively representing video information in a manner facilitating indexing of the video information. Specifically, a method according to the inveniton comprises the steps of dividing a continuous video stream into a plurality of video scenes; and at least one of the steps of dividing, using intra-scene motion analysis, at least one of the plurality of scenes into one or more layers; representing, as a mosaic, at least one of the pluraliy of scenes; computing, for at least one layer or scene, one or more content-related appearance attributes; and storing, in a database, the content-related appearance attributes or said mosaic representations.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
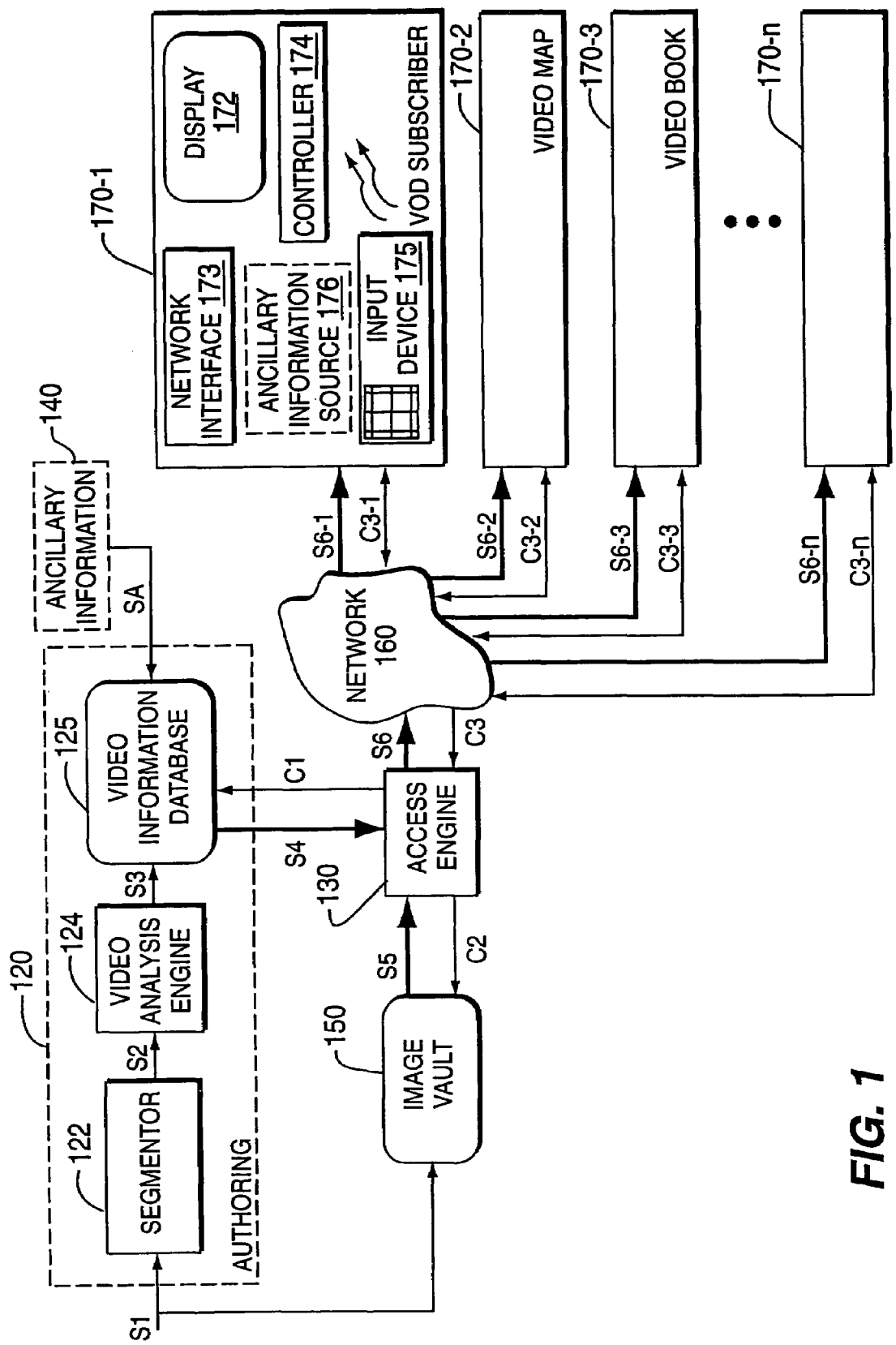
FIG. 1 depicts a high level block diagram of a video information processing system according to the invention.

The invention claims benefit of U.S. Provisional Application No. 60/031,003, filed Nov. 15, 1996, and incorporated herein by reference in its entirety.

The invention will be described within the context of a video information processing system. It will be recognized by those skilled in the art that various other embodiments of the invention may be realized using the teachings of the following description. As examples of such embodiments, a video-on-demand embodiment and a "Video-Map" embodiment will also be described.

The invention is directed toward providing an information database suitable for providing a scene-based video information to a user. The representation may include motion or may be motionless, depending on the application. Briefly, the process of constructing the scene-based video representation may be conceptualized as a plurality of analysis steps operative upon the appropriate portions of an evolving scene representation. That is, each of the various video processing techniques that will be described below are operative on some, but not all, of the information associated with a particular scene. To illustrate this point, consider the following video processing steps (all of which will be described in more detail below): segmenting, mosaic construction, motion analysis, appearance analysis and ancillary data capture.

Segmenting comprises the process of dividing a continuous video stream into a plurality of segments, or scenes, where each scene comprises a plurality of frames, one of which is designated a "key frame."

Mosaic construction comprises the process of computing, for a given scene or video segment, a variety of "mosaic" representations and associated frame coordinate transforms, such as background mosaics, synopsis mosaics, depth layers, parallax maps, frame-mosaic coordinate transforms, and frame-reference image coordinate transforms. For example, in one mosaic representation a single mosaic is constructed to represent the background scenery in a scene, while individual frames in the scene include only foreground information that is related to the mosaic by an affine or a projective transformation. Thus, the 2D mosaic representation efficiently utilizes memory by storing the background information of a scene only once.

Motion analysis comprises the process of computing, for a given scene or video segment, a description of the scene or video segment in terms of: (1) layers of motion and structure corresponding to objects, surfaces and structures at different depths and orientations; (2) independently moving objects; (3) foreground and background layer representations; and (4) parametric and parallax/depth representations for layers, object trajectories and camera motion. This analysis in particular leads to the creation of the associated mosaic representations for the foreground, background and other layers in the scene/segment.

Appearance analysis is the process of computing, for a frame or a layer (e.g., background, depth) of a scene or video segment, content-related attribute information such as color or texture descriptors represented as a collection of feature vectors.

Ancillary data capture comprises the process of capturing, through ancillary data streams (time, sensor data, telemetry) or manual entry, ancillary data related to some or all of the scenes or video segments.

Part of the invention is the selective use of the above mentioned video processing steps to provide a comprehensive method of representing video information in a manner facilitating indexing of the video information. That is, the video information may be represented using some or all of the above mentioned video processing steps, and each video processing step may be implemented in a more or less complex manner. Thus, the invention provides a comprehensive, yet flexible method of representing video for indexing that may be adapted to many different applications.

For example, a network newscast application may be adequately represented as 2D mosaic formed using a motion analysis processing step that only separates a background layer (i.e. the news set) from a foreground object (i.e., the anchorperson). A more complex example is the representation of a baseball game as multiple layers, such as a cloud layer, a field layer and a player layer. Factors including the complexity of a scene, the type of camera motion for the scene, and the critical (or non-critical) nature of the scene content may be used as guides in determing the appropriate representation level of the scene.

FIG. 1 is a high level block diagram of a video information processing system 100 according to the invention. The video information processing system 100 comprises three functional subsystems, an authoring sub-system, an access sub-system and a distribution sub-system. The three functional subsystems non-exclusively utilize various functional blocks within the video information processing system 100. Each of the three sub-systems will be described in more detail below, and with respect to the various drawings. Briefly, the authoring sub-system 120, 140 is used to generate and store a representation of pertinent aspects of raw video information and, specifically, to logically segment, analyze and efficiently represent raw video information to produce a video information database having properties that facilitate a plurality of access techniques. The access subsystem 130, 125, 150 is used to access the video information database according access techniques such as textual or visual indexing and attribute query techniques, dynamic browsing techniques and other iterative and relational information retrieval techniques. The distribution sub-system 130, 160, 170 is used to process accessed video information to produce video information streams having properties that facilitate controllably accurate or appropriate information stream retrieval and compositing by a client. Client-side compositing comprises the steps necessary to retrieve specific information in a form sufficient to achieve a client-side purpose.

Video information processing system 100 receives a video signal S1 from a video signal source (not shown). The video signal S1 is coupled to an authoring sub-system 120 and an image vault 150. The authoring subsystem 120 processes the video signal S1 to produce a video information database 125 having properties that facilitate a plurality of access techniques. For example, the video representative information resulting from the previously-mentioned comprehensive representation steps (i.e., segmenting, mosaic construction, motion analysis, appearance analysis and ancillary data capture) is stored in video information database 125. Video information database 125, in response to a control C1 requesting, e.g., video frames or scenes substantially matching some or all of the stored video representative information, generates an output signal S4 that flexibly provides video information representation information satisfying the request.

The video information database 125 is optionally coupled to an ancillary information source 140. The ancillary information source is used to provide non-video information associated with the video information stored in the database 125. Such information may include, e.g., positional information identifying, e.g., camera positions used to produce particular video segments or scenes. Such information may also comprise annotations, both visual and audible, that, e.g., identify portions of one or more frames or scenes, or provide some commentary relevant to one or more frames or scenes.

The image vault 150, illustratively a disk array or server specifically designed to store and distribute video information, stores the video information carried by video signal S1. The image vault 150, in response to a control signal C2 requesting, e.g., a specific video program, generates a video output signal S5.

An access engine 130, illustratively a video-on-demand server, generates control signals C1 and C2 for controlling, respectively, the annotated video database 125 and the image vault 150. The access engine 130 also receives the video output signal S5 from the image vault 150, and the output signal S4 from the video information database 125. The access engine 130, in response to a control signal C3, illustratively a video browser request or a video server request, produces a signal S6.

The access engine 130 is coupled to one or more clients (170-1 through 170-n) via a distribution network 160, illustratively a cable television network or a telecommunications network. Each client is associated with a control signal path (C3-1 through C3-n) and a signal path (S6-1 through S6-n). Each client 170 includes a display 172 and a controller 174. The controller 174 is responsive to user input via an input device 175, illustratively a remote control unit or a keyboard. In operation, a client 170 provides, e.g., textual and/or visual browsing and query requests to the access engine 130. The access engine responsively utilizes information stored in the annotated video database 125 and the image vault 150 to produce the signal S6 responsive to the client request.

The authoring and access subsystems will first be described in a general manner with respect to the video information processing system 100 of FIG. 1. The distribution subsystem will then be described within the context of several embodiments of the invention. In describing the several embodiments of the invention, several differences in the implementation of the authoring and access subsystems with respect to the embodiments will be noted.

The inventors have recognized that the problems of video sequence segmentation and video sequence searching may be addressed by the use of a short, yet highly representative description of the contents of the images. This description is in the form of a low-dimensional vector of real-valued quantities defined by the inventors as a multi-dimensional feature vector (MDFV). The MDFV "descriptor" comprises a vector descriptor of a predetermined dimensionality that is representative of one or more attributes associated with an image. An MDFV is generated by subjecting an image to a predetermined set of digital filters, where each filter is tuned to a specific range of spatial frequencies and orientations. The filters, when taken together, cover a wide range of spatial-frequencies and orientations. The respective output signals from the filters are converted into an energy representation by, e.g., integrating the squared modulus of the filtered image over the image region. The MDFV comprises these energy measures.

Figure 9:
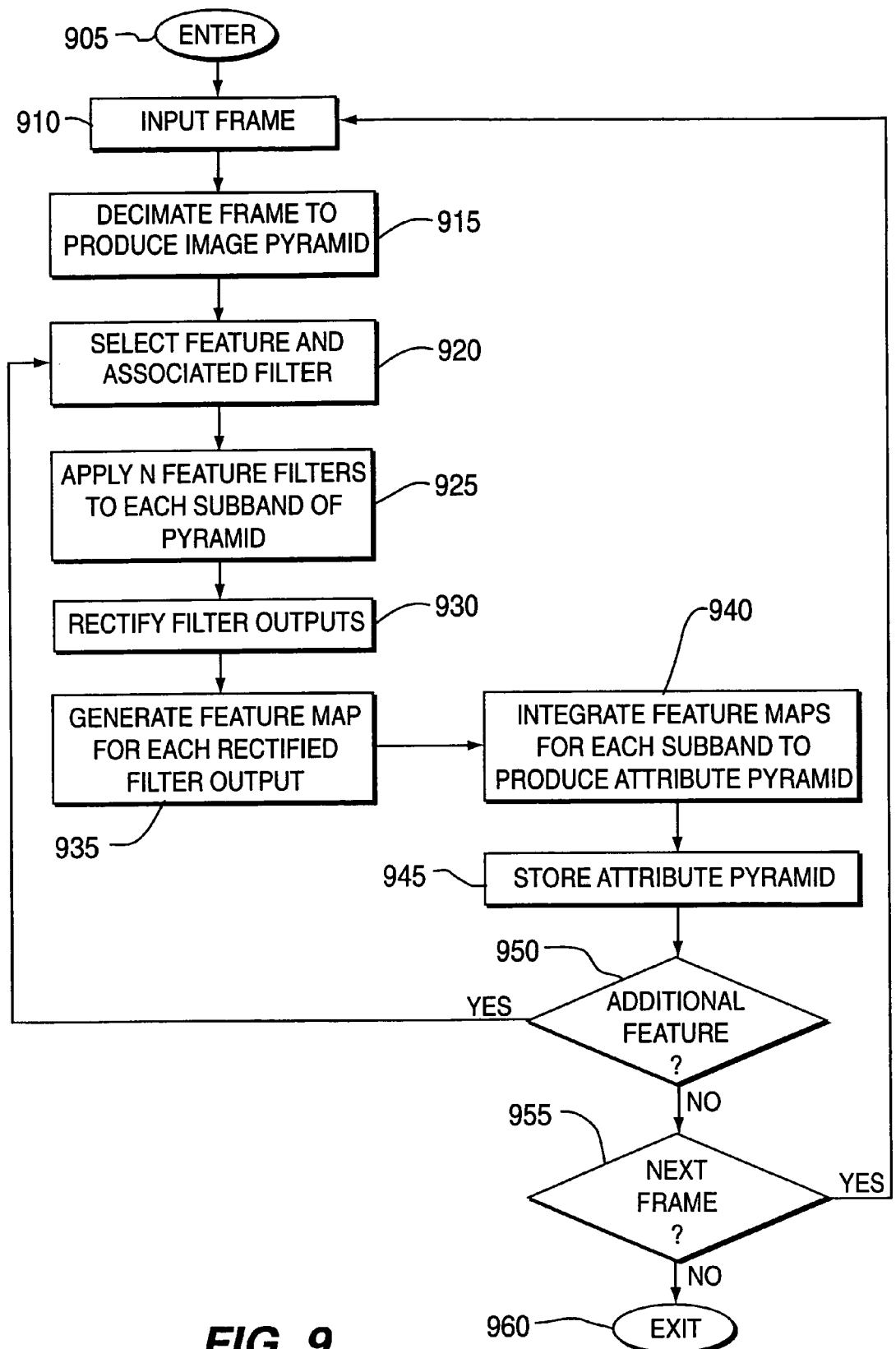
FIGS. 9 and 10 are, respectively, a flow diagram 900 and a high-level function diagram 1000 of an attribute generation method according to the invention.
Figure 10:
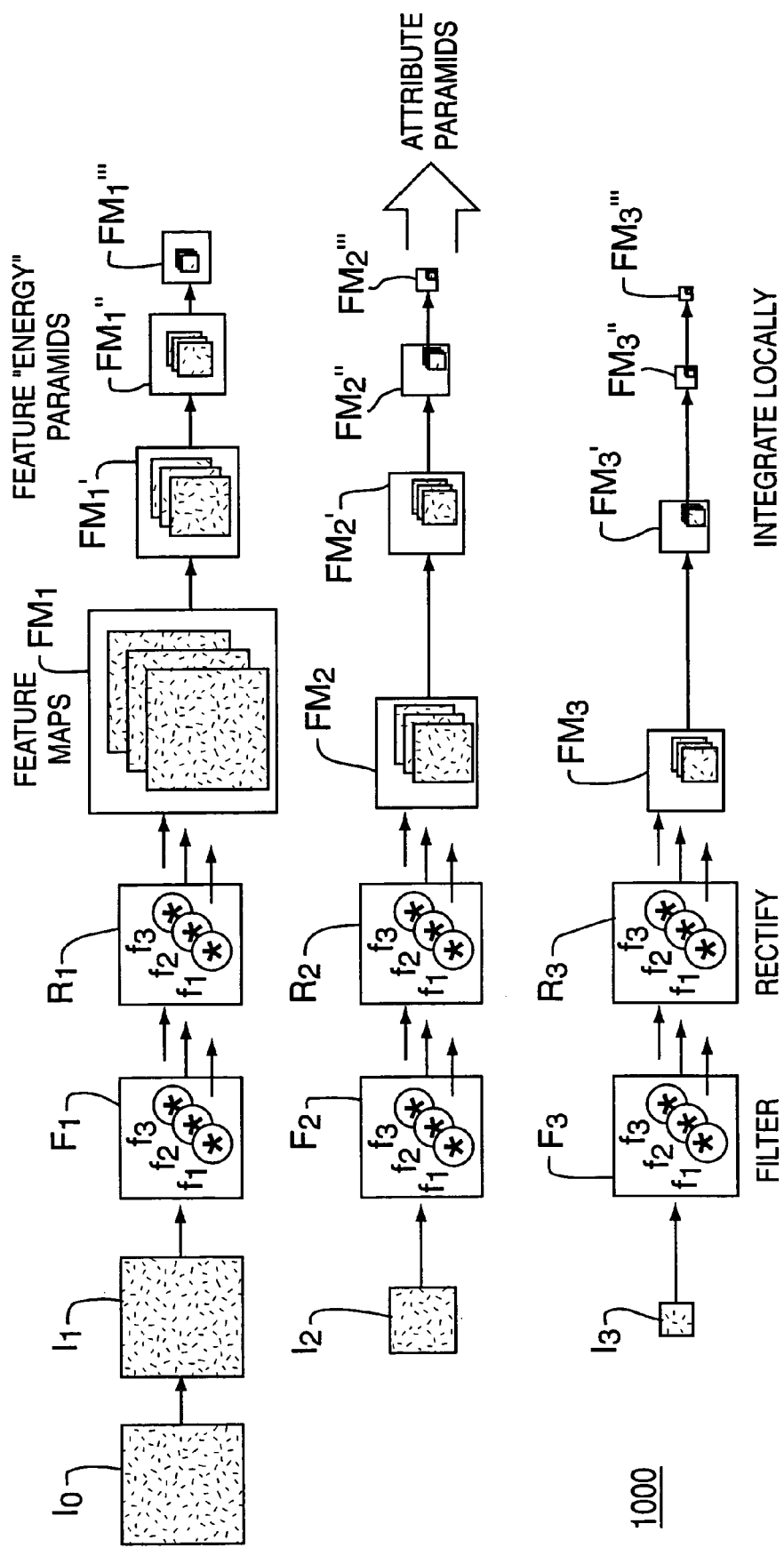

FIGS. 9 and 10 are, respectively, a flow diagram 900 and a high-level function diagram 1000 of an attribute generation method according to the invention. The method of FIG. 9 will be described with reference to FIG. 10. Specifically, the method 900 and function diagram 1000 are directed toward the processing of an input image $I_0$ to produce attribute information (i.e., $MDFV_s$) in the form of an attribute pyramid.

For the purposes of appearance-based indexing, two kinds of multi-dimensional features are computed: (1) Features that capture distributions without capturing any spatial constraints; and (2) Features that compute local appearance and are grouped together to capture the global spatial arrangement.

The first type of features that are computed do not preserve the previously, the input video signal S1 is optionally is divided into layers and moving objects. In particular, a layer may be the complete background scene or a portion of the background scene (with respect to objects deemed to be part of a foreground portion of the scene). For each of the layers (including potentially the complete background scene) a multi-dimensional statistical distribution is computed to capture the global appearance of the layer. Specific examples of these distributions are: (1) Histograms of multi-dimensional color features chosen from a suitable space, such as Lab, YUV or RGB; (2) Histograms of multi-dimensional texture-like features where each feature is the output of Gaussian and derivative and/or Gabor filters, where each filter is defined for a specific orientation and scale. These filters, which are arranged individually or as filter banks, may be efficiently computed using pyramid techniques. Multi-dimensional histograms and, in particular, many one-dimensional histograms, are defined using the output of the filters (or filter banks) at each location in a scene layer. In particular, a collection of single dimensional histograms, such as disclosed in the above-referenced U.S. application Ser. No. 08/511,258, may be used.

The second type of features that are computed preserve the spatial arrangement of the features within a layer or an object. The following steps are followed to create this representation. First, the locations of distinctive features are computed. Second, multi-dimensional feature vectors are computed for each location.

The locations of distinctive features are those locations in the layer or object where the appearance has some saliency. The inventors define saliency as a local maximum response of a given feature with respect to spatial scale. For instance, if a corner-like feature is selected to define saliency, then a filter corresponding to a corner detector is computed at a collection of closely spaced spatial scales for the filter. The scale may also be defined using the levels of a feature pyramid. The response of the filter is computed at each spatial location and across multiple scales. Locations where the filter response is a maximum both with respect to scale and with respect to neighboring spatial locations is chosen as a salient feature.

Multi-dimensional feature vectors are next computed at each salient location. That is, filter responses for filters at multiple scales and orientations are computed. These may be defined using Gaussian and derivative filters or Gabor filters. A collection of these filters that systematically sample the space of orientations and scales (within reasonable limits, for instance scale changes between ⅛ and 8, but in principle may be arbitrary) is computed. This collection as each of the salient points becomes the multi-dimensional feature representation for that point. For each layer and object, a collection of these features along with their spatial locations is stored in a database using a kd-tree (R-tree) like multi-dimensional data structure.

The attribute generation method 900 of FIG. 9 is entered at step 905, when an input frame is made available. At step 910 the input frame in retrieved, and at step 915 the input frame is subjected to a known pyramid processing step (e.g., decimation) to produce an image pyramid. In FIG. 10, the input frame is depicted as an input image $I_0$, and the pyramid processing step produces an image pyramid comprising three image pyramid subbands, $I_1$, $I_2$ and $I_3$. $I_3$ is produced by, e.g., subsampling $I_0$. $I_2$ is produced by, e.g., subsampling $I_2$. $I_3$ is produced by, e.g., subsampling $I_1$. Since each subband of the image pyramid will be processed in the same manner, only the processing of subband $I_1$ will be described in detail. Moreover, an image pyramid comprising any number of subbands may be used. A suitable pyramid generation method is described in commonly assigned and copending U.S. application Ser. No. 08/511,258, entitled METHOD AND APPARATUS FOR GENERATING IMAGE TEXTURES, filed Aug. 4, 1995, and incorporated herein by reference in its entirety.

After generating an image pyramid (step 915) the attribute generation method 900 of FIG. 9 proceeds to step 920, where an attribute feature and an associated filtering scheme are selected, and to step 925, where N feature filter are used to filter each of the subbands of the image pyramid. In FIG. 10 the image subband $I_1$ is coupled to a digital filter $F_1$ comprising three subfilters $f_1$–$f_3$. Each of the three subfilters is tuned to a specific, narrow range of spatial frequencies and orientations. The type of filtering used, the number of filters used, and the range of each filter is adjusted to emphasis the type of attribute information produced. For example, the inventors have determined that color attributes are appropriately emphasized by using Gaussian filters, while texture attributes are appropriately emphasized by using oriented filters (i.e., filters looking for contrast information in differing pixel orientations). It must be noted that more or less than three sub-filters may be used, and that the filters may be of different types.

After filtering each of the image pyramid subbands (step 925), the attribute generation method 900 of FIG. 9 proceeds to step 930, where the filter output signals are rectified to remove any negative components. In FIG. 10, the output signal from each of the three subfilters $f_1$–$f_3$ of digital filter $F_1$ is coupled to a respective subrectifier within a rectifier $R_1$. The rectifier $R_1$ removes negative terms by, e.g., squaring the respective output signals.

After rectifying each of the filter output signals (step 930), the attribute generation method 900 of FIG. 9 proceeds to step 935, where a feature map is generated for the attributes represented by each rectified filter output signal. In FIG. 10, feature map $FM_1$ comprises three feature maps associated with, e.g., three spatial frequencies and orientations of subband image $I_1$. The three feature maps are then integrated to produce a single attribute representation $FM_1'''$ of subband image $I_1$.

After generating the feature maps (step 935), the attribute generation method 900 of FIG. 9 proceeds to step 940, where the respective feature maps of each subband are integrated together in one or more integration operations to produce an attribute pyramid. In FIG. 10, the previously-described processing of subband image $I_1$ is performed for subband images 12 and $I_3$ in substantially the same manner.

After producing the attribute pyramid related to a particular attribute (step 940), the routine 900 of FIG. 9 proceeds to step 945, where the attribute pyramid is stored, and to step 945, where a query is made as to whether any additional features of the image pyramid are to be examined. If the query at stop 945 is affirmatively answered, then the routine 900 proceeds to step 920, where the next feature and its associated filter are selected. Steps 925–950 are then repeated. If the query at step 945 is negatively answered, then the routine 900 proceeds to step 955, where a query is made as to whether the next frame should be processed. If the query at step 955 is affirmatively answered, then the routine 900 proceeds to step 910, where the next frame is input. Steps 915–955 are then repeated. If the query at step 955 is negatively answered, then the routine 900 exits at step 960.

It is important to note that the attribute information generated using the above-described attribute generation method 900, 1000 occupies much less memory space than the video frame itself. Moreover, a plurality of such attributes stored in non-pyramid or pyramid form comprise an index to the underlying video information that may be efficiently accessed and searched, as will be described below.

The first functional subsystem of the video information processing system 100 of FIG. 1, the authoring sub-system 120, will now be described in detail. As previously noted, the authoring sub-system 120 is used to generate and store a representation of pertinent aspects of raw video information, such as information present in video signal S1. In the information processing system 100 of FIG. 1, the authoring subsystem 120 is implemented using three functional blocks, a video segmentor 122, an analysis engine 124 and a video information database 125. Specifically, the video segmentor 122 segments the video signal S1 into a plurality of logical segments, such as scenes, to produce a segmented video signal S2, including scene cut indicia. The analysis engine 124 analyzes one or more of a plurality of video information frames included within each segment (i.e., scene) in the segmented video signal S2 to produce an information stream S3. The information stream S3 couples, to an information database 125, information components generated by the analysis engine 124 that are used in the construction of the video information database 125. The video information database 125 may also include various annotations to the stored video information and ancillary information.

The segmentation, or "scene cut function of the authoring subsystem 120 will now be described in detail. Video segmentation requires the detection of segment or scene boundaries using e.g., a "scene cut detector" that detects inter-frame discontinuities indicative of a change in scene, rather than a change in intra-frame information. This technique utilizes the fact that consecutive video frames are highly correlated and, in most cases, all frames in a particular scene have many attributes in common. A common example to an attribute used for scene cut detection is the background. Each scene shot is assumed to have a single background and was shot at a single location, possibly from a small range of camera viewpoints.

Figure 2:
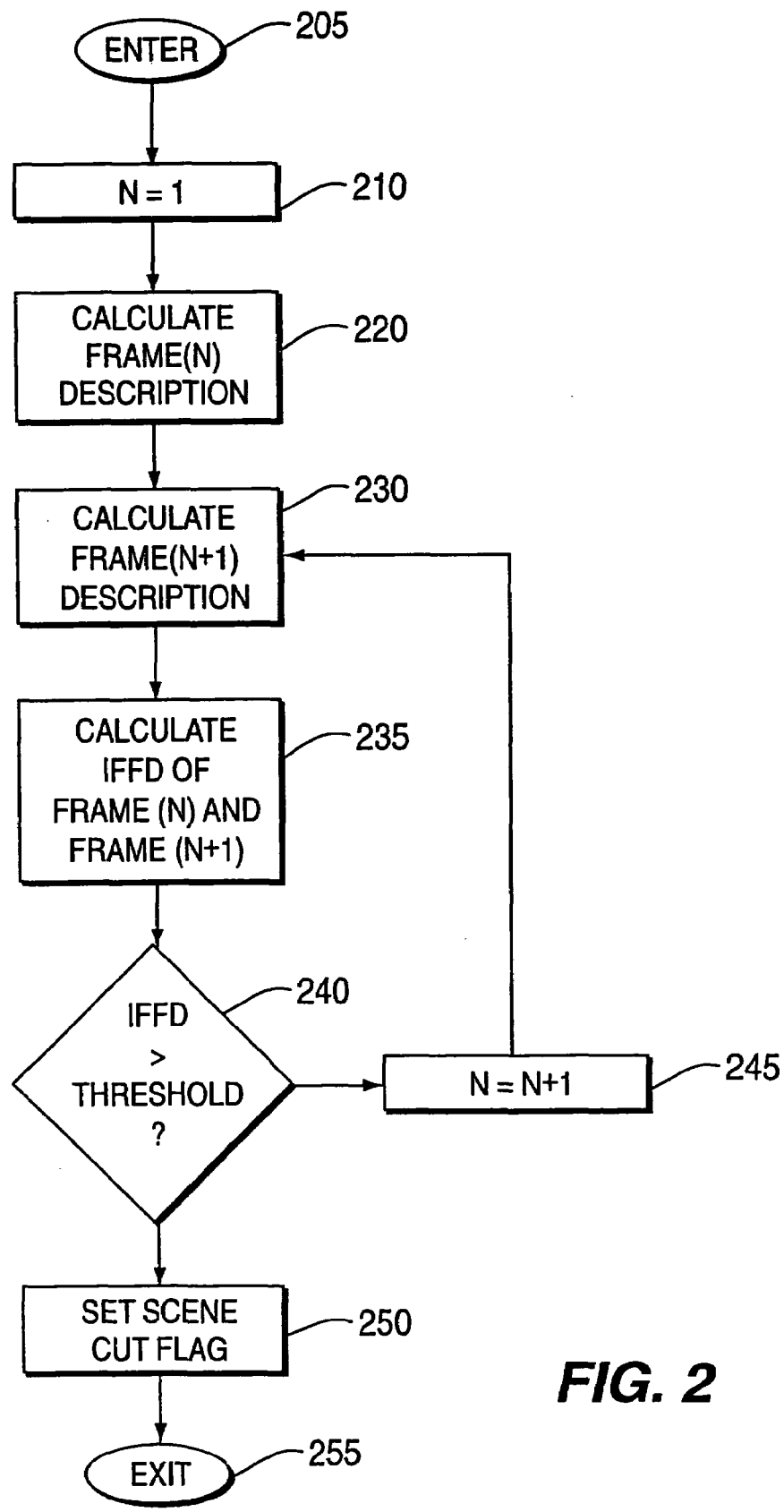
FIG. 2 is a flow diagram of a segmentation routine suitable for use in the video information processing system of FIG. 1.

FIG. 2 is a flow diagram of a segmentation routine suitable for use in the video information processing system of FIG. 1.

The segmentation routine 200 is entered at step 205, when the first frame of a new scene is received. The segmentation routine 200 then proceeds to step 210, where an index variable N is initialized to 1, and to step 220, where at least one of the above-described vector descriptors are calculated for the Nth frame. The segmentation routine 200 then proceeds to step 230, where vector descriptors corresponding to those calculated at step 220 are calculated for the Nth+1 frame. Steps 220 and 230 may be implemented according to the principles of the attribute generation routine 900 discussed above.

After calculating the representative MDFV descriptors for the Nth (step 220) and Nth+1 (step 230) frames, the segmentation routine 200 then proceeds to step 235, where the difference (e.g., the Euclidian distance) between the Nth and Nth+1 MDFV descriptors is computed, to produce an interframe feature distance (IFFD). The segmentation routine 200 then proceeds to step 240, where the IFFD is compared to a threshold level. If the exceeds the threshold level (i.e., frame N is different than frame N+1 by the threshold amount), then the segmentation routine 200 proceeds to step 250, where the scene cut flag is set, and to step 255, where the segmentation routine 200 is exited. If the IFFD does not exceed the threshold level, then the index variable N is incremented by one (step 245), and steps 225–240 are repeated until a scene cut is detected.

The IFFD threshold level is either a predetermined level or, preferably, computed using the IFFD statistics of the available frames. Typically, this threshold is related to a "median" or other rank measures of the input set (i.e., the MDFV descriptors of the input frames). The segmentation routine 200 is depicted as operating in a single pass mode. However, the segmentation routine 200 can also be implemented in a two pass mode. In the single pass mode, the IFFD threshold level statistics are preferably determined on a running" basis (e.g., a rolling average or other statistic based on the M most recent frames). In the two-pass mode, the IFFD threshold level statistics are preferably determined during the first pass and applied during the second. The one-pass mode is more suitable for a real-time implementation of the video segmentor 122.

Other scene cut detection methods may also be used. For example, a known method for scene cut detection is described in "Automatic Partitioning of Full-Motion Video", H J Zhang, A. Kankanhalli, and S. W. Smoliar, Multimedia Systems, 1993, p.p. 10–28, incorporated herein by reference in its entirety.

Figure 3:
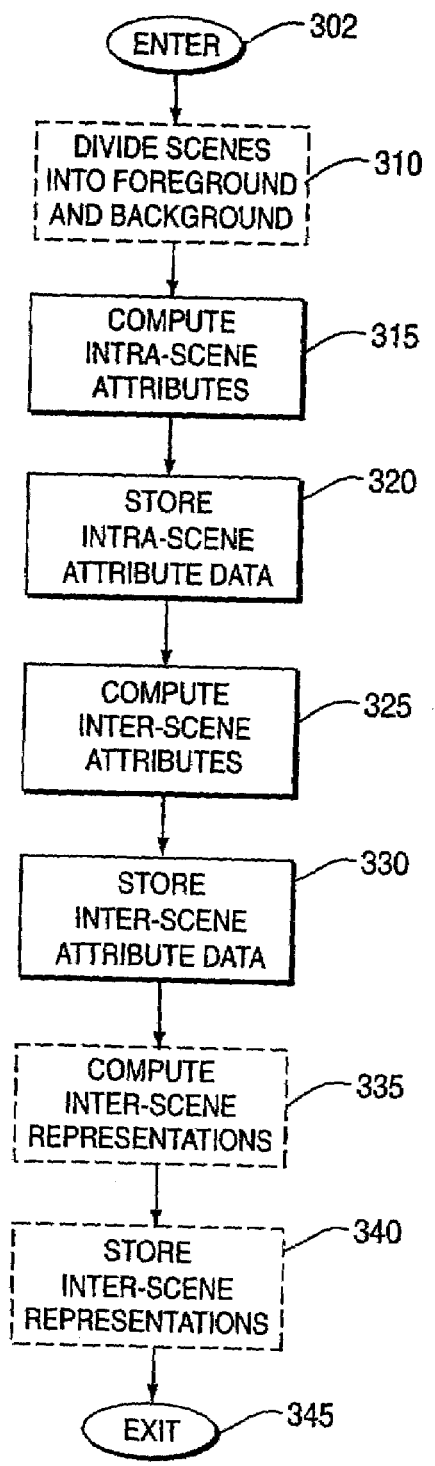
FIG. 3 is a flow diagram of an authoring routine suitable for use in the video information processing system of FIG. 1.

The analysis function of the authoring subsystem 120 will now be described in detail. FIG. 3 is a flow diagram of an authoring process 300 suitable for use in the video information processing system of FIG. 1. The authoring process need not be performed in real time, since the access process will typically be non-contemporaneous to the authoring process. If the authoring process 300 is to be performed in real time, the input video signal S1 is buffered in a first-in first-out memory (not shown) to control the data rate of the input video signal S1.

The analysis routine 300 is entered at step 302, when the analysis video engine 124 receives a segmented information stream S2, illustratively an input video signal or stream S1 that has been divided into segments, or scenes, by segmentor 122.

After receiving the segmented video stream S2, the analysis routine 300 proceeds to optional step 310, where the scene if further divided into background and foreground portions. This further division of the scene is useful in scenes represented using mosaicing techniques that will be described in more detail below and with respect to FIG. 7. For example, a scene may be represented by a two-dimensional mosaic, in which a single mosaic is constructed to represent the background portion of the scene, and each frame in the scene is related to the mosaic by an affine or a projective transformation. The foreground and background portions of a scene are identified utilizing, e.g., motion identification and layering techniques. These techniques will be described below.

After the scene is optionally segmented into background and foreground portions, the routine 300 proceeds to step 315, where intra-scene attributes (i.e., intra-segment or frame-to-frame attributes) of each scene in the segmented video information stream S2 are calculated. Intra-scene attributes, which will be discussed in more detail below, comprise intra-frame and inter-frame attributes of video frames within a particular video scene (i.e., attributes characteristic of one or more of the video information frames forming a scene). The previously described multi-dimensional feature vectors ($MDFV_s$) may be used as intra-scene attributes. The analysis routine 300 then proceeds to step 320, where the calculated intra-scene attributes are stored in a video attribute database, such as video information database 125.

After calculating the intra-scene attributes of each scene, the analysis routine 300 proceeds to step 325, where inter-scene attributes (i.e., inter-segment or scene-to-scene attributes) of the segmented video information stream S2 are calculated. Inter-scene attributes, which will be discussed in more detail below, comprise attributes characteristic of one or more of the scenes forming a group of scenes (e.g., temporal order and the like). The calculation of step 325 utilizes information generated at step 315 and other information. The analysis routine 300 then proceeds to step 330, where the calculated inter-scene attributes are stored in a video attribute database, such as video information database 125.

After calculating the inter-scene attributes of the segmented video information stream S2, the analysis routine 300 then proceeds to optional step 335, where inter-scene representations, or "groupings" are calculated. The analysis routine 300 then proceeds to optional step 340, where the calculated representations are stored in a video attribute database, such as video information database 125. Inter-scene representations, which will be discussed in more detail below, comprise logical groupings of scenes to produce expanded visual representations of common subject matter (e.g., mosaics, 3D models and the like). The inter-scene grouping calculation and storage steps are optional because such representations or groupings are not used in every application.

The analysis routine 300 exits at step 345 when the input video signal S1 has been fully processed by the various functional blocks of the authoring sub-system. The result of the analysis routine 300 is a video attribute database, such as video information database 125, that includes a plethora of information related to the input video signal S1.

In the video information processing system 100 of FIG. 1, the input video signal S1, in a compressed or uncompressed form, is stored in image vault 150. Since one of the attributes of a scene is the presentation time of the scene (i.e., the time relative to the start of the video program that includes the scene), a scene identified using the video information database 125 may be retrieved from the image vault by retrieving the video information having the same presentation time.

The above-described analysis routine 300 refers to intra-scene attributes, inter-scene attributes, and inter-scene groupings. These concepts will now be described in detail.

Video information comprises a sequence or collection of video information frames, where each video frame is associated with a set of attributes. The set of attributes associated with a particular frame may be classified in a number of ways. For example, frame-specific attributes are those attributes of a video information frame that relate to the arrangement of video information within the particular frame. Examples of frame-specific attributes include distributions of luminance, chrominance, texture and shape; location coordinates of objects; textual and visual annotations and descriptions and the like. Segment-specific attributes are those attributes of a video information frame that relate to the arrangement of video information within a segment, or scene, comprising a plurality of video information frames. Examples of segment-specific attributes include the frame number of a particular video frame in a sequence of video frames, identification of a scene that the particular video frame is part of, geographic location and temporal information relating to the scene, static and dynamic geometric information relating to camera location(s) and usage (e.g., parallax information), identification of actors and objects within the scene, and the like. Other classifications may also be used, several of which will be discussed in other portions of this disclosure. Moreover, individual attributes may be utilized within a number of classifications.

In addition to intra-scene or intra-segment attributes, such as the frame-specific and segment-specific attributes derived directly from respective frame parameters and segment parameters, collections of frames or segments (sequential or otherwise) may be associated with "summaries," i.e., textual or visual descriptions of, e.g., an entire scene. In response to a user query (or non-linear browse), textual or video summaries may be provided instead of a frame or segment response. In either case, both the video frame/segment response and the textual/visual summary response are suitable for initiating a further query.

Inter-scene or inter-segment (i.e., scene-to-scene or segment-to-segment) attributes may also be calculated to enable grouping or associating scenes or segments sharing one or more attributes. For example, two segments sharing, e.g., very similar background textures may comprise temporally shifted versions of the same scene. For example, a particular camera angle generates a scene having similar textural features over time (e.g., a top-down view of a football game). A request for all scenes sharing the common textural feature may be satisfied by retrieving the video images associated with scenes meeting the parameters of the textural query.

The above-described attribute classifications are used to generate a video information database 125 having properties that facilitate a plurality of access techniques. The video information database 125 will typically include intra-frame, inter-frame and inter-scene attribute data, any associated annotations, and address indicia associating the frame and scene attribute information with the actual video frames and scenes stored in the image vault 150. While the image vault 150 and the video information database 125 may be within the same mass storage device, this is not necessary. By accessing the attribute information using one or more of the various attribute classification sets, a user may access the video information frames and segments associated with attribute information. The user may also retrieve the stored attribute classification sets with or without the associated video information frames and segments, such as geometric information, dynamic information, ancillary information and the like.

It should be noted that it is not necessary to compute appearance attributes for every frame in a particular scene, since such frames tend to be highly correlated to begin with. Thus, the appearance attributes computed at step 315 of the analysis routine 300 are computed only for "representative frames," e.g., mosaics or key frames within a scene. The selection of key frames can be done automatically or manually for the specific application at hand. Similarly, appearance attributes are computed for objects of interest, which may be defined either automatically using segmentation methods such as motion based segmentation, into coherently moving layers, or through color and texture analysis, or through manual outlining and specification of patches within a scene.

Appearance attributes of each representative frame and each object within a scene are computed independently and associated with the scene for subsequent indexing and retrieval of, e.g., the stored video. The appearance attributes consist of color and texture distributions, shape descriptions, and compact representations in terms of outputs of multiple scale, multiple orientation and multiple moment Gaussian and Gabor like filters. These attributes are organized in terms of data structures that will allow similarity queries to be answered very efficiently. For example, multi-dimensional R-tree data structures can be used for this purpose.

Each frame or scene in a video stream may be registered to a reference coordinate system. The reference coordinates are then stored along with the original video. This registration, or representation, of scenes allows, e.g., efficient storage of the video information comprising the scenes.

After calculating the attribute information associated with the scenes comprising a particular program, the scenes may be grouped together and represented using one or more of a plurality of representation techniques. For example, video scenes may be represented using, e.g., two-dimensional mosaics, three-dimensional mosaics and networks of mosaics. A mosaic comprises an association, or joining, of a plurality of related video images to produce a combined video image having, e.g., additional field of view, panoramic effects and the like. In addition to providing new viewing experiences to a user, such representations of video information allow more efficient storage of the video information.

An example of a two-dimensional (2D) mosaic video representation is described in commonly assigned and copending U.S. application Ser. No. 08/339,491 entitled SYSTEM FOR AUTOMATICALLY ALIGNING IMAGES TO FORM A MOSAIC IMAGE, filed Nov. 14, 1994, and incorporated herein by reference in its entirety. In such a mosaic-based representation technique, a single mosaic is constructed to represent the background scenery in each scene. Each frame in the scene is related to the mosaic by an affine or a projective transformation. Thus, the 2D mosaic representation efficiently utilizes memory by storing the background information of a scene only once.

An example of a three-dimensional (3D) mosaic video representation is described in commonly assigned and copending U.S. application Ser. No. 08/493,632, entitled METHOD AND SYSTEM FOR IMAGE COMBINATION USING A PARALLAX-BASED TECHNIQUE, filed Jun. 22, 1995, and incorporated herein by reference in its entirety. A three-dimensional mosaic comprises a 2D image mosaic and a parallax mosaic. The parallax mosaic encodes the 3D structure of the scene. Each frame in the scene is related to the 3D mosaic by a 12 dimensional perspective transformation.

An example of a network of mosaics video representation is described in commonly assigned and copending U.S. application Ser. No. 08/499,934, entitled METHOD AND SYSTEM FOR RENDERING AND COMBINING IMAGES, filed Jul. 10, 1996, and incorporated herein by reference in its entirety. The network of mosaics comprises a network of 2D mosaics, where each mosaic corresponds to a single location. Each mosaic is constructed from the video captured by only rotating the camera about that single location. All mosaics are related to each other by coordinate transforms between them.

Video scenes may also be used to create three-dimensional structure models of various objects or portions of a scene. An interactive method to create a 3D structure model from video scenes is described in: "Reconstructing Polyhedral Models of Architectural Scenes from Photographs", C. J. Taylor, P. E. Debevec, and J. Malik, Proc. 4th European Conference on Computer Vision, Cambridge, UK, April 1996, pp. 659–668, incorporated herein by reference in its entirety.

Video scenes may also be represented in terms of foreground and background. The above-incorporated U.S. application Ser. No. 08/339,491 describes a technique for generating a model of the background portions of a scene. Foreground objects within the scene are obtained by aligning the background model with a video frame, and then subtracting the background from the frame. The values obtained by such subtraction are regarded as residuals. As discussed in U.S. application Ser. No. 08/339,491, foreground residuals may be encoded using discrete cosine transform (DCT), wavelet or other compression techniques.

Video scenes may also be represented in terms of "layers." Layers are an extension to the basic mosaic concept for representing background motion. In the layered video representation, a separate mosaic "layer" is constructed for a foreground object. The foreground object is then tracked on a frame to frame basis by tracking the layer incorporating the object. Each shot is stored as a set of layered mosaics, a set of warping parameters for each layer for each frame, and a set of foreground residuals (if present). Representation of shots into layers may be achieved by techniques described in: "Layered Representation of Motion Video using Robust Maximum-Likelihood Estimation of Mixture Models and MDL Encoding", S. Ayer and H. Sawhney, Proc. IEEE Intl. Conference on Computer Vision, Cambridge, Mass., June 1995, pp. 777–784, and in: "Accurate Computation of Optical Flow by using Layered Motion Representation", Proc. Intl. Conference on Pattern Recognition, October 1994, pp. 743–746, both of which are incorporated by reference in their entireties.

The above-referenced layering techniques may be used in optional step 310 of the analysis routine 300.

Scene representations, such as the mosaics, or other representations constructed for each frame, are grouped using their attributes to create a unified representation for all the frames. Since a movie or a sports event is typically imaged using just a few cameras and set locations, a large number of the frames will have a similar background. A possible criterion for grouping shots can therefore be a common background. In this case only one background mosaic needs to be stored for the entire group of frames. The grouping may be done manually, or automatically using techniques from the field of pattern recognition.

An automatic technique for grouping together scene shots based on color histograms was described in "Efficient Matching and Clustering of Video Shots", M. Yeung and B. Liu, IEEE Int. Conf. Image Processing, October 1995, Vol. A, pp. 338–341, incorporated herein by reference in its entirety.

To summarize, visual information is represented by a collection of scenes, or frame sequences. Each frame sequence typically includes a set of background and foreground models (e.g. mosaics), a viewing transformation which relates each frame to the appropriate model, and residual values for each frame that correct for those effects that can not be represented by the model and viewing transformation. In addition to the visual information stored in, e.g., the image vault 150, appearance information related to the visual information is generated and stored in, e.g., video information database 125. Annotations, such as street names and various geographic, temporal and relational data may also be stored in the database.

Figure 7:
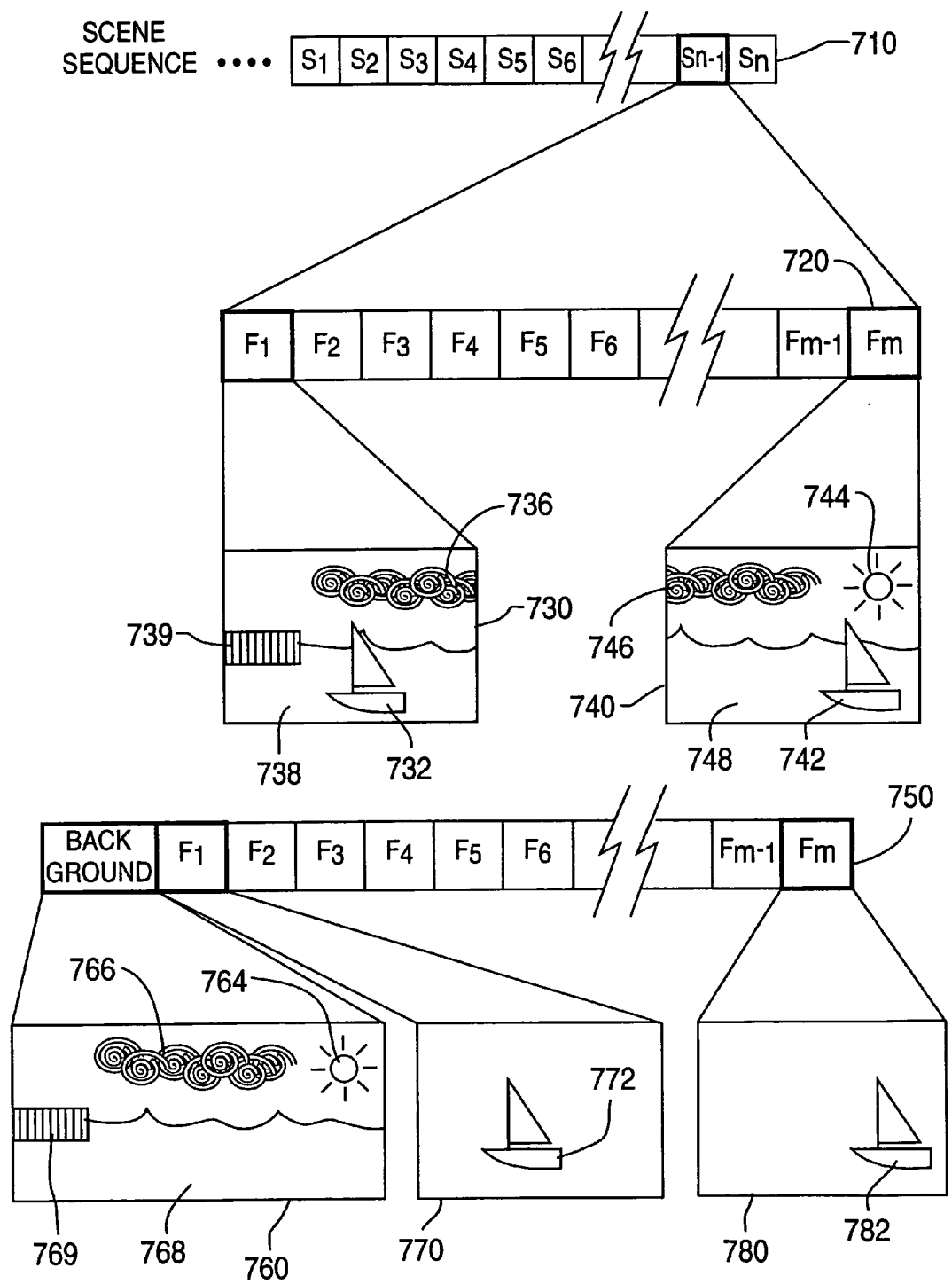
FIG. 7 is a graphical representation of the relative memory requirements of two scene storage methods.

FIG. 7 is a graphical representation of the relative memory requirements of two scene storage methods. Specifically, structure and memory contents of a two-dimensional mosaic representation of a scene. A video program 710 comprises a plurality of scenes denoted as $S_1$ through $S_n$. A scene 720, illustratively scene $S_{n-1}$, comprises a plurality of video frames denoted as $F_1$ through $F_m$, where $F_1$ is the most recent frame. The video content of frames $F_1$ and $F_m$ are shown as respective pictures 730 and 740. Note that both pictures include a boat 732, 742 floating in a body of water 738, 748 beneath at least a portion of a cloud cover 736, 746. Picture 730 also contains a dock 739, while picture 740 contains the sun 744 but not the dock 739. Frames $F_2$ through $F_{m-1}$ are the intervening frames of scene 720, and show the scene changing from frame $F_1$ to frame $F_m$.

Frame sequence 750 represents a two-dimensional mosaic of scene $S_{n-1}$. As previously discussed, the two-dimensional mosaic comprises a background image related to all the frames in a particular scene, and a plurality of foreground images related to respective foreground portions of each frame of the scene. Thus, background frame 760 is shown as a panoramic picture comprising all the background information in scene $S_{n-1}$, i.e., a dock 769, a body of water 768, a cloud 766 and the sun 764. Frames $F_1$ and $F_m$ show only the respective foreground portions, comprising the boat (732, 742).

The pictures 730–740, and 760–780 are depicted in a graphical manner only for the purpose of illustrating the relative informational requirements to store each frame. It must be remembered that frames 770 and 780 require transformation information relating the residual foreground information (i.e., the boats) the background information (i.e., background picture 760). Therefore, it can be seen that the informational requirements for storing the two-dimensional mosaic 750 of scene $S_{n-1}$ are much less than the informational requirements for storing the standard frame sequence 720 of scene $S_{n-1}$, since the background portion of the scene, i.e., picture 760, is only stored once. Each of the frames within the two-dimensional mosaic representation of scene $S_{n-1}$, i.e., each of the frames within frame sequence 750, comprise only foreground and transform coordinate information.

The second functional subsystem of the video information processing system 100 of FIG. 1, the access subsystem, will now be described in detail. The access subsystem is implemented using three functional blocks, the access engine 130, the image vault 150 and the video information database 125.

Assuming that a video stream has been previously divided into subsequences, the access subsystem addresses, for example, the problem of finding a subsequence(s) to which a given frame belongs. This need arises during indexing and retrieval of stored video information for video editing and manipulation purposes. For example, given a representative frame from one subsequence, the user may be interested in determining other subsequences that contain images of the same scene.

The access sub-system is used to access the video information database using, textual query techniques, non-linear video browsing (i.e., "hyper-video") techniques, and linear browsing techniques. A textual query may comprise, e.g., a command to "find all video frames in a specific movie showing a specific actor," or "find all the touchdown scenes in all games that were played in a specific city during a specific period." A non-linear video browsing technique may comprise, e.g., iteratively grouping attribute-related video frames and video segments, where each successive frame or segment selection retrieves more relevant, or desirable, video information frame or segments for display. A linear video browsing technique may comprise, e.g., pointing to a specific displayed object, such as a baseball player, using a pointing device; and retrieving other scenes including the identified object (player), or displaying a list of all games played by this player. An object representative of a location (e.g., second base) may also be used. In addition, a region maybe defined (e.g., boxed or otherwise delineated) and other regions having the same or similar appearance characteristics, such as color or texture, may be retrieved.

Referring to FIG. 1, the access engine 130, in response to a textual, non-linear or linear access request from a user (e.g., from a client 170 via the network 160), accesses the video information database and identifies video frames and/or scenes together with geometric, dynamic and other scene structure information that satisfy the user request. As previously noted, the video information database 125 will typically include intra-frame, inter-frame and inter-scene attribute data, any associated annotations, and address indicia associating the frame and scene attribute information with the actual video frames and scenes stored in the image vault 150. A user may interactively access the attribute data alone, or the attribute data in conjunction with the actual video frames and/or scenes. If the user wishes to view the actual video frames and/or scenes, then the access engine causes the image vault 150 to generate a video output signal S5. The video output signal S5 is then coupled to the user as signal S6.

The access engine 130 is capable of retrieving specific video information on a frame-by-frame basis by performing a search on a representative feature(s) of the desired video frames. As previously discussed, individual video frames are represented by a plurality of attributes which have been stored in a video information database 125. The access engine 130 utilizes the video information database 125 to retrieve, e.g., address indicia of frames or scenes corresponding to one or more desired attributes.

Figure 8:
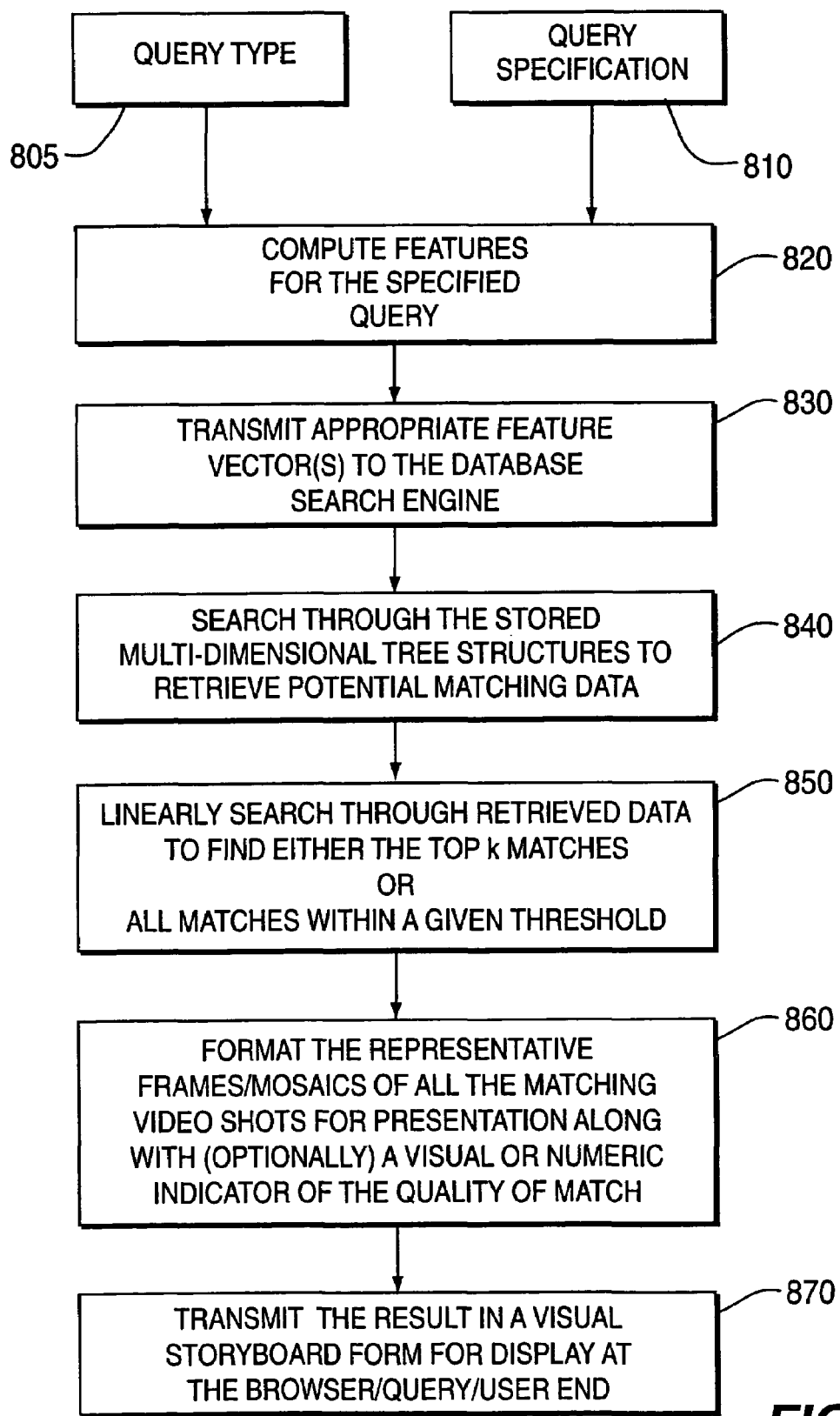
FIG. 8 is a flow diagram of a query execution routine according to the invention.

FIG. 8 is a flow diagram of a query execution routine according to the invention. A methodology for searching for individual video frames in the available frame subsequences (i.e., scenes) relies on the previously-described multi-dimensional feature vector descriptor representation of individual frames, and assumes that the input sequence has been previously segmented into subsequences and processed by the authoring subsystem 120.

The routine 800 is entered when a user specifies a query type (step 805) and a query specification (step 810). A query type comprises, e.g., color, texture, keywords and the like. A query specification is a more particular identification of the query type, such as particular color, particular texture, particular keywords and the like. The query specification may be selected using, e.g., a pointing device to select a particular portion of a displayed image. The specification may also be used to limit the number of frames or objects matching the search criteria to a finite number k.

The routine 800 proceeds to step 820, where features for the specified query are calculated using, e.g., the techniques previously described with respect to multi-dimensional feature vectors. In the case of a keyword query, the keywords may be associated with ancillary information, or with attribute information stored in, e.g., a table. The routine 800 then proceeds to step 830, where the appropriate feature vectors are transmitted to a database search engine, illustratively access engine 130. It should be noted that step 820 may be implemented at the client side (i.e., within client 170) or at the server side (i.e., within access engine 130). In the latter case, the query type and query specification are necessarily transmitted to the server prior to step 820.

The routine 800 proceeds to step 840, where the database search engine performs a similarity query of the database to retrieve all data potentially satisfying the query. The routine 800 proceeds to step 850, where the retrieved data is linearly searched using, e.g., epsilon range and/or k-ranked matching criteria.

The routine 800 proceeds to step 860, where the video information related to the data remaining after the linear search (step 850) is formatted for presentation to the user. The formatting may also comprise indicium of the quality of the match between the user query and the particular data being formatted. The routine 800 proceeds to step 870, where the formatted data is transmitted to the user in an appropriate form, e.g., a storyboard form for subsequent browsing by the user.

Video information may be indexed and accessed according to temporal attributes. Such temporal attributes include: (1) Frame viewing time, e.g., the time from the beginning of the video, which is equivalent to a frame number and analogous to a page in a book; (2) Scene viewing time, which is equivalent to a scene number and analogous to a chapter in a book; (3) Camera time stamp, which is indicative of the date and time the video was recorded; and (4) Event time, which is the date and time a video recorded event was known to have occurred, or some derivative of the date and time (e.g., round number in a boxing match, a quarter in a football game, a historical date in a documentary and the like).

In each of the above temporal accessing examples, the user querying the video information database (via an access engine) may retrieve several frames or scenes. However, the user may then browse through, e.g., the list of mosaics representing the backgrounds of the selected shots. If a region of particular interest is identified, then the frames corresponding to that region may be selectively displayed.

Video information may be indexed and accessed according to content-based attributes. Such content-based attributes include: (1) Background content, e.g., all scenes with the same background; (2) Foreground content, e.g., all scenes with the same foreground objects; (3) Particular event or motion content, e.g. all scenes including a particular object or having a particular motion patterns; (4) Grouped scenes, e.g., a consecutive sequence of scenes that appear in the same pattern can be grouped together as "super-scenes" that may be accessed as such; (5) Scene audio content, e.g., the words included in a closed caption portion of the video stream (using, e.g., a textual search method); (6) Multiple language audio content, if such content is available; and (7) Annotations associated with each video, such as textual annotations, symbolic annotations (using a shape-based search), and the annotations previously discussed with respect to ancillary information.

Database indexing and accessing using the above content-based attributes may be initiated by a user selecting, using an input device, an attribute-related portion of a displayed image, or an associated soundtrack or a dosed-caption portion of an image/soundtrack previously retrieved from the database. In addition, the user may provide a new picture, image or audio clip to, e.g., the authoring subsystem to generate background or foreground attributes that may be used to access the database. It should be noted that image access may be realized by using a pre-computed table or, alternatively, appearance-based descriptors could be computed for the desired background, and compared with same descriptions for the database video.

Another content-based attribute suitable for video information indexing and accessing is the location of an image. In response to a user's selection of a particular location in an image (or input of map, GPS or other reference coordinates), video clips associated with that location may then be accessed.

In the case of, e.g., a mosaic representation video information having desired attributes, the access subsystem uses the transformation between the video frames and the image representation to retrieve other frames or scenes where the particular location or attribute is visible. This technique is described in commonly owned and copending U.S. application Ser. No. 08/663,582 entitled A SYSTEM FOR INDEXING AND EDITING VIDEO SEQUENCES USING A GLOBAL REFERENCE filed Jun. 14, 1996 and incorporated herein by reference in its entirety.

The presentation of video information, still image information and other information retrieved from the video information database 125 or the image vault 150 may be adapted to suit particular applications of the invention. For example, the presented information may be annotated or unannotated. Moreover, the presentation may be adapted to facilitate further querying. The following is a partial list of the video information presentation possibilities.

The video information maybe presented as a single video frame, or a collection of isolated frames, in response to a user's query. Such frames are part of the original images and video sequences used to create the video information database. Similarly, the video information may be presented as a single scene, or a collection of scenes, from the original video. The video information may be presented in one of the previously described mosaic formats. Such a mosaic is usually pre-computed prior to a query, and is displayed, completely or in part, as an answer to the query.

The video information may be presented as one or more newly generated images. For example, when queried using positional information, the system can generate a new view of a scene or object as seen from that particular viewing position. Methods to use video representations to create a desired view are described in U.S. application Ser. No. 08/493,632 and in U.S. application Ser. No. 08/499,934. Other methods for new view generation, like those using a 3D CAD model, can be used as well. An example is described in "Reconstructing Polyhedral Models of Architectural Scenes from Photographs", C. J. Taylor, P. E. Debevec, and J. Malik, Proc. 4th European Conference on Computer Vision, Cambridge, UK, April 1996, pp. 659–668, incorporated herein by reference in its entirety.

The video information may be presented in a manner that highlights dynamic content (e.g., foreground or moving objects). For example, in order to more clearly view moving objects and other dynamic content as well as the static background, the dynamic content can be overlaid on a static summary mosaic of the background to show a compete summary of the video in an expanded view format.

Figure 4:
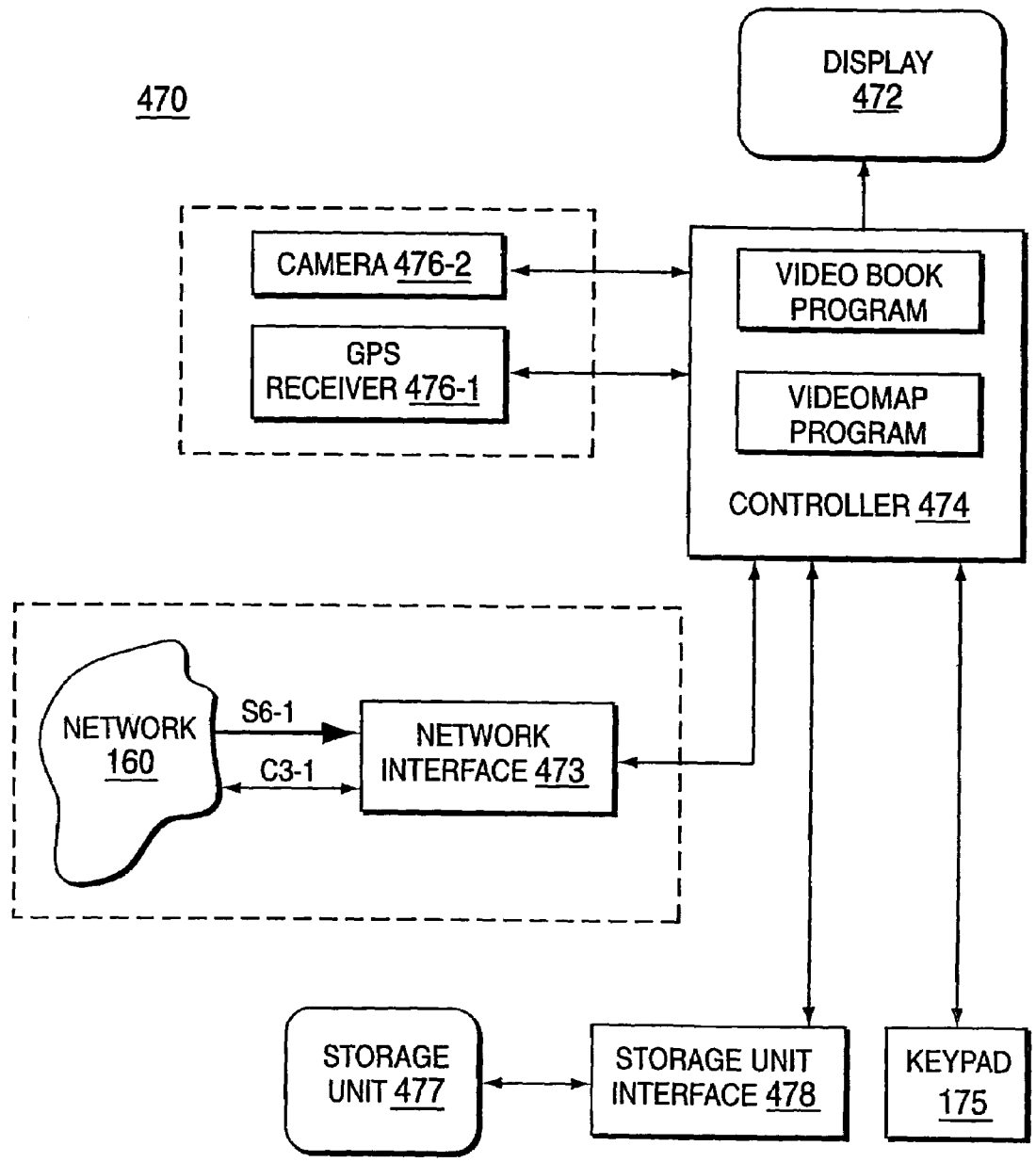
FIG. 4 depicts a "Video-Map" embodiment of the invention suitable for use as a stand-alone system, or as a client within the video information processing system of FIG. 1.

FIG. 4 depicts a "Video-Map" embodiment 470 of the invention suitable for use as a stand-alone system, or as a client 170-2 within the video information processing system 100 of FIG. 1. The Video-Map 470 comprises a display 472, a network interface 473, a controller 474 and an input device 475 that operate in substantially the same manner as previously described with respect to the client 170 of FIG. 1. The Video-Map 470 also includes one or more ancillary information sources 476 suitable for providing positioning information, illustratively a Global Positioning System (GPS) receiver 476-1 and a digital camera 476-2. The ancillary information source(s) 476 provide information that is used by the controller 474 to generate video information database queries.

The Video-Map 470 optionally includes a video storage unit 477, such as a CD-ROM drive, that is coupled to the controller 474 via a video storage unit interface 478. The video storage unit 477 is used to store an annotated video information database, such as the annotated video information database 125 similar to that of the information processing system 100 of FIG. 1. The video storage interface 478, in conjunction with the controller 474, performs substantially the same function as the access engine 130 of the information processing system 100 of FIG. 1.

The Video-Map 470, in the client mode of operation, communicates with the access engine 130 of the information processing system 100 via network interface 173, which is coupled to a network 160, illustratively a cellular or satellite telecommunications network 160.

The purpose of the Video-Map embodiment is to capture, annotate and represent visual and other information about a geographic environment in a structured form, and to be able to access and present both the visual and other information at a later time in a form that situates the browser in the geometric and visual context of the current environment.

Figure 5:
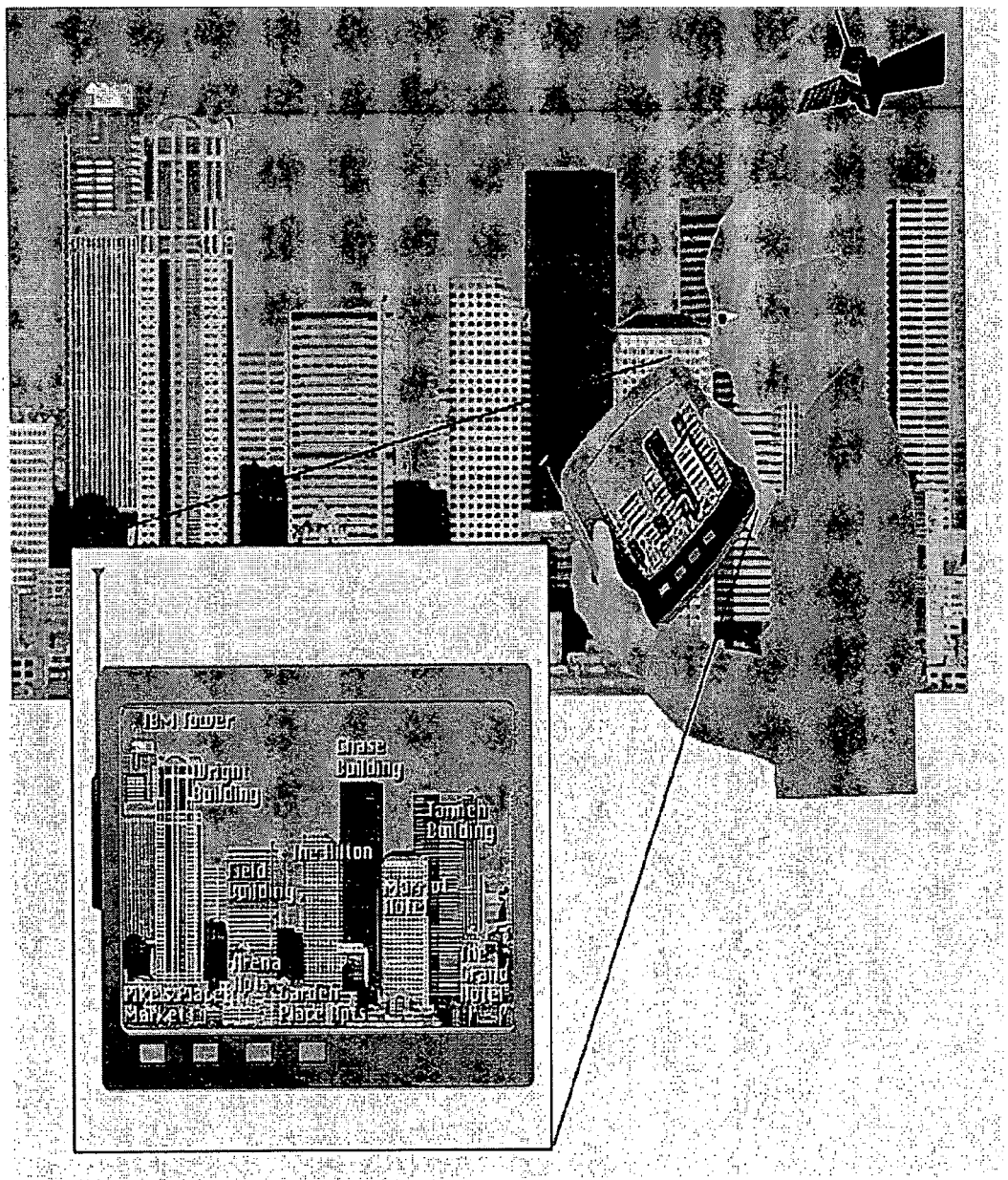
FIG. 5 shows a user holding the Video-Map embodiment of FIG. 4, and an exemplary screen display of an annotated image of the skyline of New York city.

FIG. 5 shows a user 505 holding the Video-Map embodiment 470 of FIG. 4, and an exemplary screen display 510 of an annotated image of the skyline of New York city. It should be noted that the displayed image is similar to what the user sees with his eyes. However, the displayed image is annotated such that many of the buildings are identified by corresponding text 521, 522, 523. The information necessary to produce the displayed image is stored in an annotated video information database either locally (i.e., in the video storage unit 472) or remotely (i.e., in the video information database 125 of FIG. 1).

The representation of the city of New York stored in the local or remote video information database includes the geometric, visual and ancillary information about landmarks and locales of interest. This annotated representation is created from video images captured through a variety of sources, and from mapping and ancillary information obtained from other sources. This annotated database is typically stored in a compressed format on one or more storage platforms. To conserve memory and processing resources, the displayed image may be a still image.

The stored database is accessed by providing ancillary information that approximately locates the user within the coordinate system space of the video information representation stored in the video information database. Such ancillary information may include positional data, e.g., data retrieved from the GPS receiver 476-1. The positional information forms the basis of a query into the video information database. That is, the controller 474 constructs a query of the form "show all portions of the New York city skyline visible from this location." In the client mode of operation, the query is transmitted to the access engine 130 via the network in the previously described manner. The access engine retrieves the appropriate view of New York City from the video information database 125, and coupled the retrieved view to the Video-Map 470 via the network 160. In the stand-alone mode of operation, the controller 474, in conjunction with the video storage interface 478, identifies and retrieves the appropriate view from the video storage unit 477. The appropriate view in either mode of operation may is coupled to the display 472 for viewing by the user.

The stored database is optionally accessed by providing ancillary information that includes single or multiple views in a visual form for the locale of interest, e.g., image data retrieved from the camera 476-2. The retrieved image data is subjected to an attribute identification process, and the resulting attribute information forms the basis of a query into the video information database.

In either the positional data case, or the visual attribute case, the access information is used to index into the video map database, and the retrieved information is presented to the viewer is a useful form. For example, the visual information may be presented in the form of an image/mosaic or video as would be seen from the viewpoint of the client. The presented information may optionally be annotated with textual, graphical or audible information, and other multimodal annotations that are associated with the accessed locale. The annotations may be used to explain to the user the identity, function and other pre-stored relevant information of the objects in the presented field of view. Furthermore, the user may select, using the input device 475, different parts of the image to interactively access more information about a selected building or site of interest. The user can further query the system using any additional indices, such as hotel, restaurant, tourist interest and the like. Moreover, the Video-Map may be used as a navigation tool.

Figure 6:
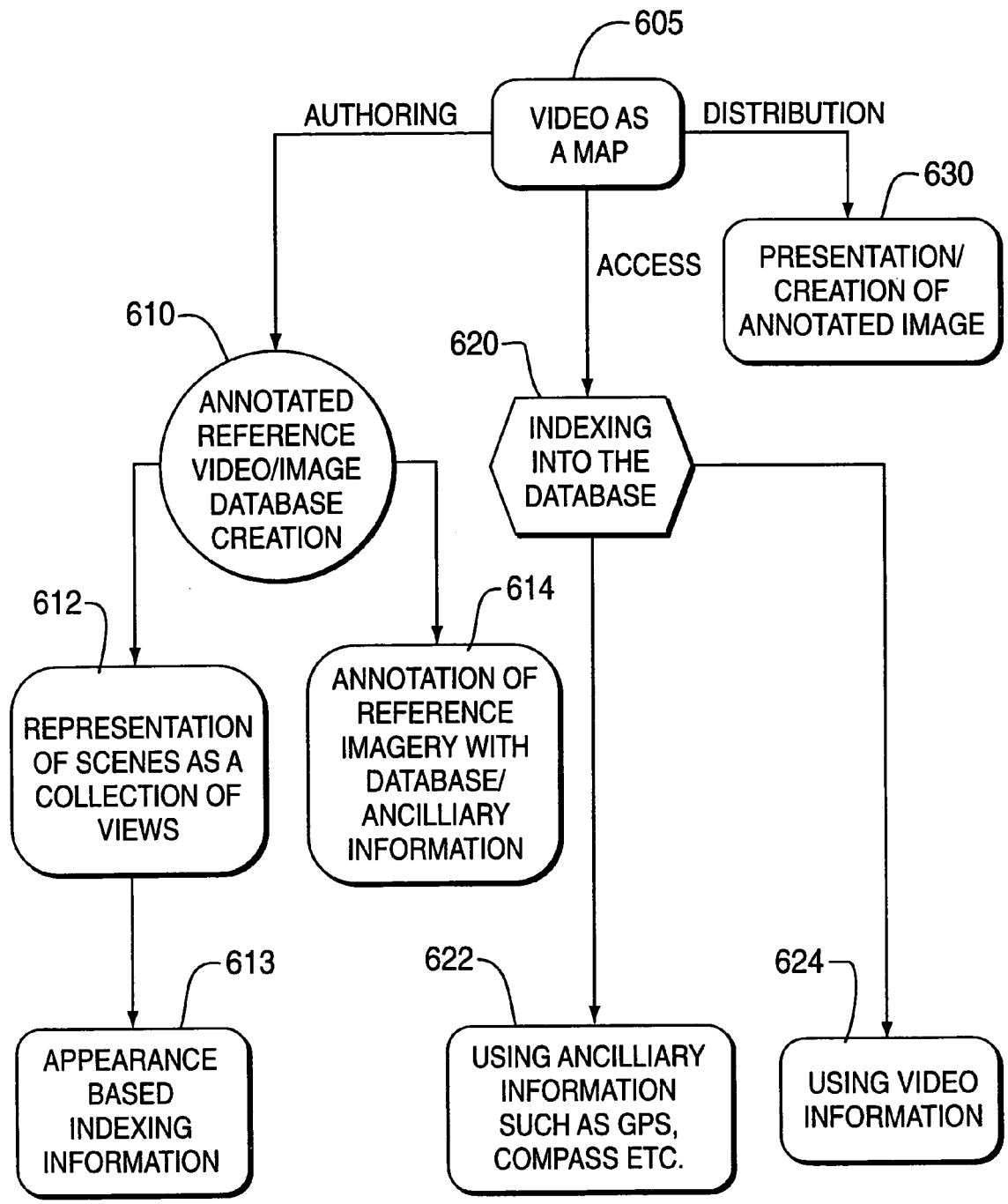
FIG. 6 depicts exemplary implementation and use steps of the Video-Map embodiment of FIG. 4.

FIG. 6 depicts exemplary implementation and use steps of the Video-Map embodiment of FIG. 4. There are three main components of the video map embodiment of the invention: First, creating an annotated video map database (steps 610, 612, 613 and 614); Second, accessing the video map database (620, 622 and 624); and Third, presenting and viewing the visual and ancillary annotation information (630). It will be understood by those skilled in the art that the particular methods taught by this embodiment of the invention are not the only methods suitable for implementing the invention. Other methods useful to the practice of the invention are also contemplated to be within the scope of the invention. For example, in aerial imagery applications, the video-map database may be created by using geo-referenced satellite imagery.

The first component of the Video-Map embodiment, creating an annotated video map database (i.e., authoring) will now be described. Starting with a collection of videos of a set of locales (e.g., New York), a video information database is generally constructed as previously described. The key to implementing the video map application is proper representation of the video information. Specifically, a collection of layered 2D and 3D mosaic images and parallax maps compactly represent the geometric and visual information of the locale (step 612). This representation of the actual video information is stored in the image vault 150 and video information database 125 or storage unit 477, along with the coordinate transforms that relate other such representations associated with a locale. The fundamental methodology for developing this representation was described above and in U.S. application Ser. No. 08/493,632. This representation allows generation of either the original collection of videos that were used to create the representation, or new views of the same locales that were not present in any particular frame of the original video.

In addition to the representation of the geometric and visual information (step 612), two other classes of information are associated with the map database. One class represents the visual information not in terms of pixels and their color/intensity values (as is done in the above representation) but as higher order features that are computed from the pixel information. These features represent the distributions and spatial relationships of color, texture and shape like significant features of a locale that can describe the visual appearance of significant structures in a compact form (step 613). In general, these features are multidimensional vectors, matrices and tensors that encode significant visual appearances compactly. These features and their combinations will be used to index and match a specified query in the form of the appearance of an object/view of a locale at the time of map database access.

The third class of information associated with the map database consists of geographical map coordinates, GPS coordinates, textual descriptions of objects and views of a locale, audio/close-caption descriptions and any other ancillary information that may be application specific in the context of a video map 614. This information may be associated with locales, objects, views and/or a collection of these. An annotation process 614 incorporates positional information (e.g., map coordinates and the like) into the video information database as ancillary information.

Each of these three classes of information is stored in a form allowing efficient indexing and matching of class information to associated video information to access the relevant database locale.

The second component of the Video-Map embodiment, accessing the video map database, will now be described. Access to the map database 620 is provided through queries that maybe formulated using visual and/or ancillary data. As previously described, GPS coordinates are one source of ancillary data 622. Similarly, street names, cross streets and textual descriptions are other forms of queries that may be used to access the map information 622. In other applications, it may be more relevant to provide a single view or a collection of views of the locale of interest or visual descriptions of significant structures in the locale as queries 224. Any of these query mechanisms may be combined to form a complex query. The database supports all these mechanisms.

The indexing algorithms are more complicated when a single view or collection of views is used for performing a query. In that case, the input views need to be registered with the reference video/images stored in the database. Features based on appearance may be used perform a coarse level of indexing and provide an initial estimate. Finally, a fine level registration is accomplished by directly correlating the input imagery to the reference video. Methods for performing this two level process are described above and in U.S. application Ser. No. 08/493,632.

The third component of the Video-Map embodiment, presenting and viewing the visual and ancillary annotation information, will now be described. Once the video-map information is accessed through any of the query mechanisms described above, the visual and ancillary information is presented to the user in a form in which the view of the locale of interest corresponds to the position and orientation specified in the query 230. The ancillary annotations are presented as hyperlinks registered with the visual features. An important feature of the presentation is that once a locale and its view has been chosen, the user can navigate through that locale very fast by taking a virtual walk-through in the map database of the locale. The ancillary annotations change according to the change of the view. The user can select any of these annotations and access more information about that particular site. The new views may be created from the video-map database using methods described above and in U.S. application Ser. No. 08/499,934.

A "Video-Book" is a video access methodology allowing rapid access to portions of a video sequence of interest to a viewer. Specifically, the Video-Book addresses the presentation of a video program, such as a movie, sports event, or any other video program. The inventors use the term Video-Book to acknowledge the book-like representation of video information. The Video-Book may be implemented as a stand-alone device (similar to the Video-Map), or as a client 170 in the information processing system 100 of FIG. 1.

The Video-Book utilizes a temporal index that is analogous to the table of contents at the beginning of a written book, and a context index that is analogous to the index at the end of a written book. The temporal index of the Video-Book is a set of scenes, as previously described with respect to the video map. Upon request, all scenes of a video program can be displayed to a user in a storyboard (i.e., linear) fashion. When this storyboard is displayed, a single frame is used to depict each scene. This frame may be, e.g., a key frame within the scene or a visual summary of the scene, such as a mosaic image.

After browsing the storyboard of the video scenes, the user may interactively request a more detailed description of the scene(s), such as a panoramic mosaic, a pre-written description of the scene contents (i.e., a scene summary) and the like. The user can also request to see the actual video of the entire scene, or a sequence of scenes. The viewer can also request similar scenes, where similarity is defined using the above-described attribute information by some of the pre-computed attributes as defined earlier in this disclosure. The movie can be pre-annotated, and this annotation can be used for further indexing into the video.

Video-Book usage is typically a highly non-linear, interactive presentation of a video program with enhanced modes of visualization. For example, consider the case of a sports event such as a soccer game organized and presented to a user/viewer as a Video-Book. The Video-Book user may play the entire event in a conventional, end-to-end (i.e., linear) manner. More interestingly, the user may view visual summary representations of the entire event, where each summary is organized and presented on the basis of a visual or other attribute. A summary presentation may be in the form of a time-sequenced, low-resolution view of the entire game in terms of thumbnail images (i.e., a single image comprising a plurality of small images) of key scenes and events in the game. Other summary presentations may use visual or non-visual attributes as specified by the user. For example, visual attributes may be used to arrange, by visual similarity, all the scenes in the game, where visual similarity is defined using static scene content, dynamic object motion, and camera motion. A number of visual attributes may be used to generate visual summaries, thereby enabling the user to rapidly navigate and view the selections of interest. For the purpose of browsing a game, attributes might include similar scenes, such as the center field of the goal posts; dynamic events, such as a scored goal; annotations consisting of names of players and the like. These visual summaries provide the user with an enhanced mode of visualization of sections of the game.

Mosaic images of backgrounds of scenes overlaid with action of the players is an attractive enhanced playback mode in which the original action can be viewed on a wide field of view background. Similarly, trajectories of players shown on background mosaics is another visualization mode. Thus, the Video-Book is applicable to a number of high-end user applications, such as 1) annotation and visualization rich video services for sports, news, documentaries and movies; 2) video clip art services that provide rapid access to clips of interest, for instance for advertisement creators; and 3) education and training videos for educational, government, military and commercial/industrial uses.

It is to be emphasized that the use of software/hardware tools and representations underlying the creation of Video-Book may not be limited to only end-user applications. The representation, manipulative and visualization capabilities provided by these tools will be critical for any use that demands efficient video data management. Applications of this include video editing, managing and archiving large collections of videos for instance in government, military aerial video collections, and authoring multimedia content where videos are an important source of data. Therefore, the data representations, authoring tools and algorithms and user interaction and visualization tools may all be together or independently suited for a wide variety of video applications.

The information processing system 100 of FIG. 1 may be utilized as a video-on-demand (VOD) server. A client 170 in a VOD system will typically include a consumer television (i.e., display device 172), a remote control (i.e., input device 175) and a set top terminal (i.e., controller 174 in combination with network interface 173). The VOD client-server application is directed to providing rapid program selection and program visualization to a client (i.e., subscriber).

Programs are stored in the image vault 150, and accessed by the access engine 130 in conjunction with the video information database 125. The database formation and access techniques are substantially the same as those techniques previously described. Additional access and distribution concerns involve billing and content restriction management.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings, such as computer-implemented processes and apparatuses for practicing those processes.

What is claimed is:

1. A method for comprehensively representing video information in a manner facilitating indexing of the video information, comprising the step of:
   segmenting a video stream into a plurality of scenes, each of said scenes comprising at least one video frame;
   dividing, using intra-scene motion analysis, at least one of said plurality of scenes into at least one scene foreground layer and a scene background layer;
   representing each scene background layer as a mosaic, said background layer mosaic defining a key frame of a respective scene; and
   representing each of said at least one video frames forming said scene as a difference between initial video frame imagery and a respective portion of said key frame.

2. The method of claim 1, further comprising the steps of:
   computing, for at least one of said scene foreground and background layers, one or more content-related appearance attributes; and
   storing, in a database, said scene content-related appearance attributes or said mosaic representations.

3. The method of claim 2, further comprising the steps of storing representations of said plurality of scenes in a mass storage unit; and
   retrieving, in response to a database query, scenes associated with content-related appearance attributes defined in said database query.

4. The method of claim 1, wherein said mosaic representation comprises one of a two dimensional mosaic, a three dimensional mosaic and a network of mosaics.

5. The method of claim 2, wherein said step of computing a content-based appearance attribute for a layer of a scene comprises the steps of:
   generating an image pyramid of said layer;
   filtering, using one or more filters associated with said content-based appearance attribute, each subband of said image pyramid to produce respective one or more feature maps associated with each subband; and
   integrating said one or more feature maps associated with each respective subband to produce respective attribute pyramid subbands, wherein each of said attribute pyramid, subbands comprises a content-based appearance attribute subband associated with a corresponding image pyramid subband.

6. The method of claim 5, wherein said content-based appearance attribute comprises at least one of a luminance attribute, a chrominance attribute and a texture attribute.

7. The method of claim 5, wherein said step of filtering further comprises the step of:
   rectifying each of said one or more feature maps associated with each subband.

8. The method of claim 5, further comprising the step of:
   collapsing said attribute pyramid subbands to produce a content-based appearance attribute.

9. The method of claim 2, further comprising the step of:
   receiving a request for video information substantially matching a desired content-related appearance attribute; and
   retrieving video frames or scenes having at least one layer associated with content-related appearance attributes substantially matching said desired content-related appearance attribute.

10. The method of claim 9, wherein said step of receiving a request comprises the steps of
    identifying a query type and a query specification, said query type comprising one of a luminance, chrominance and texture query type, said query specification defining a desired property of said identified query type;

selecting a predetermined filter type associated with said identified query type; and calculating, using said predetermined filter type and said desired property, a desired content-related appearance attribute, said desired content-related appearance attribute being suitable for comparing to said content-related appearance attributes stored in said database.

11. The method of claim 1, further comprising the steps of:

storing, in a database, ancillary information associated with one or more layers or frames of one or more scenes.

12. The method of claim 1, wherein said step of segmenting comprises the steps of:

generating a descriptor vector of a predetermined type for each video frame of a video information stream;

calculating a difference between descriptor vectors of successive frames; and generating a scene cut indicium in response to said calculated difference exceeding a threshold level.

13. The method of claim 1, wherein said step of segmenting comprises the steps of:

generating, in a first pass, a descriptor vector of a predetermined type for each video frame of a video information stream;

calculating, using said generated descriptor vectors, a descriptor vector threshold level;

calculating, in a second pass, a difference between descriptor vectors of successive frames; and generating a scene cut indicium in response to said calculated difference exceeding a threshold level.

14. A method for browsing a video program stored in a mass storage unit, said video program comprising a plurality of scenes, said method comprising the steps of:

providing a database associated with the stored video program, said database comprising attribute information associated with at least a representative portion of said plurality of video frames forming each scene, where said plurality of scenes comprise a plurality of video frames including a key frame comprising a mosaic of an intra-scene background layer;

formulating a query utilizing attribute information associated with a desired video frame;

searching said database to identify video frames substantially satisfying said query; and retrieving, from said mass storage unit, one or more of said identified video frames.

15. The method of claim 14, wherein said step of formulating a query comprises the steps of:

selecting a query type;

selecting a query specification; and computing a multi-dimensional feature vector using said query type and query specification.

16. The method of claim 15, wherein said query specification is selected by identifying a portion of a displayed image, and said multi-dimensional feature vector is calculated using said query type and said identified potion of said displayed image.

17. The method of claim 16, further comprising the steps of:

formatting, for subsequent presentation on a display device, each scene Including one or more of said identified video frames; and transmitting said formatted scenes.

18. A computer-readable medium having stored thereon a plurality of instructions, the plurality of instructions including instructions which, when executed by a processor, cause the processor to perform the steps of:

(a) segmenting a video stream into a plurality of scenes, each of said scenes comprising at least one video frame;

(b) dividing, using intra-scene motion analysis, at least one of said plurality of scenes into at least one scene foreground layer and a scene background layer;

representing each scene background layer as a mosaic, said background layer mosaic defining a key frame of a respective scene; and representing each of said at least one video frames forming said scene as a difference between initial video frame imagery and a respective portion of said key frame.

19. The computer-readable medium of claim 18, further having stored thereon an additional plurality of instructions, the additional plurality of instructions including instructions which, when executed by a processor, cause the processor to perform the additional steps of:

computing, for at least one of said scene foreground and background layers, one or more content-related appearance attributes; and storing, in a database, said scene content-related appearance attributes or said mosaic representations.

20. The computer-readable medium of claim 19, further having stored thereon an additional plurality of instructions, the additional plurality of instructions including instructions which, when executed by a processor, cause the processor to perform the additional steps of:

storing representations of said plurality of scenes in a mass storage unit; and retrieving, in response to a database query, scenes associated with content-related appearance attributes defined in said database query.

21. The computer-readable medium of claim 19, wherein said mosaic representation comprises one of a two dimensional mosaic, a three dimensional mosaic and a network of mosaics.

22. The computer-readable medium of claim 19, wherein the stored instruction of computing a content-based appearance attribute for a layer of a scene, when executed by a processor, cause the processor to perform the steps of:

generating an image pyramid of said layer, filtering, using one or more filters associated with said content-based appearance attribute, each subband of said image pyramid to produce respective one or more feature maps associated with each subband; and integrating said one or more feature maps associated with each respective subband to produce respective attribute pyramid subbands, wherein each of said attribute pyramid subbands comprises a content-based appearance attribute subband associated with a corresponding image pyramid subband.

23. The computer-readable medium of claim 22, wherein said content-based appearance attribute comprises at least one of a luminance attribute, a chrominance attribute and a texture attribute.

* * * * *

UNITED STATES PATENT AND TRADEMARK OFFICE
CERTIFICATE OF CORRECTION

PATENT NO. : 6,956,573 B1
DATED : October 18, 2005
INVENTOR(S) : James Russell Bergen et al.

It is certified that error appears in the above-identified patent and that said Letters Patent is hereby corrected as shown below:

Title page,
Item [56], References Cited, OTHER PUBLICATIONS,
"Smoliar et al" reference, after "et al" insert -- . --.

Column 5,
Line 25, after "preserve the" insert -- spatial arrangement of the features within a layer or object. As described --.

Column 6,
Line 19, after "and $I_3$." delete "$I_3$" and insert -- $I_1$ --.

Column 7,
Line 55, after "cut" insert -- " --.

Column 8,
Line 39, insert -- " -- before "running"".

Column 14,
Line 28, delete "maybe" and insert -- may be --.

Column 16,
Line 10, delete "dosed" and insert -- closed --.
Line 44, delete "maybe" and insert -- may be --.

Column 19,
Line 43, delete "maybe" and insert -- may be --.

Column 22,
Line 43, delete "," before "subbhands".
Line 65, after "of" insert -- : --.

UNITED STATES PATENT AND TRADEMARK OFFICE
CERTIFICATE OF CORRECTION

PATENT NO.    : 6,956,573 B1
DATED         : October 18, 2005
INVENTOR(S)   : James Russell Bergen et al.

It is certified that error appears in the above-identified patent and that said Letters Patent is hereby corrected as shown below:

Column 23,
Line 64, delete "Including" and insert -- including --.

Signed and Sealed this

Twenty-first Day of February, 2006

JON W. DUDAS
*Director of the United States Patent and Trademark Office*